Feb. 16, 1932.  M. H. BENNETT  1,845,576
APPARATUS FOR TESTING CONDENSERS
Filed May 9, 1930  2 Sheets-Sheet 1

Inventor
Morris H Bennett
By his Attorneys
Philip Sawyer Rice Kennedy

Feb. 16, 1932.  M. H. BENNETT  1,845,576
APPARATUS FOR TESTING CONDENSERS
Filed May 9, 1930  2 Sheets-Sheet 2
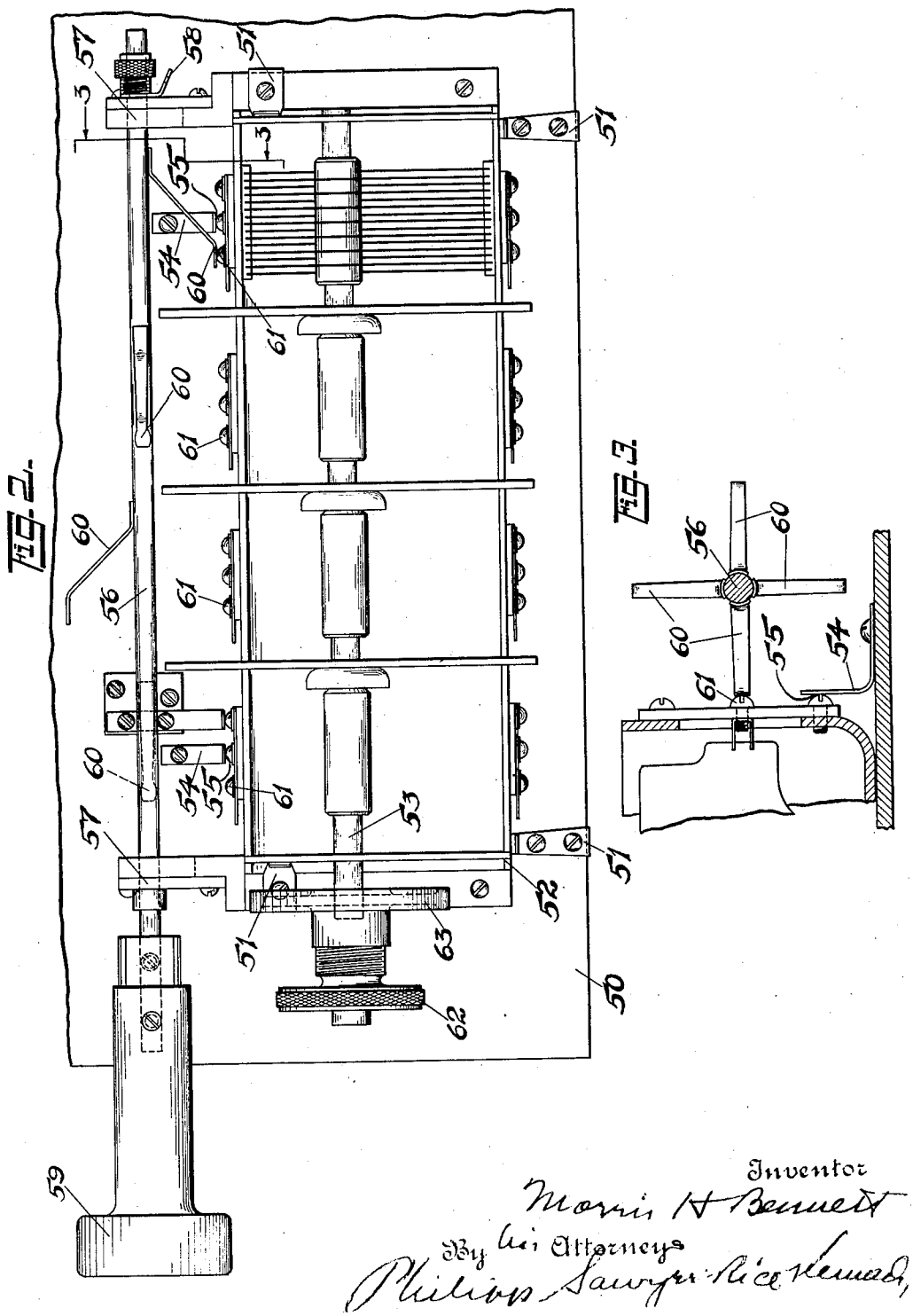
Inventor
Morris H Bennett
By his Attorneys Patented Feb. 16, 1932

1,845,576

UNITED STATES PATENT OFFICE

MORRIS H. BENNETT, OF WATERBURY, CONNECTICUT, ASSIGNOR TO SCOVILL MANUFACTURING COMPANY, OF WATERBURY, CONNECTICUT, A CORPORATION OF CONNECTICUT

APPARATUS FOR TESTING CONDENSERS

Application filed May 9, 1930. Serial No. 450,922.

This invention relates to a method and apparatus for testing electrical condensers.

It is an object of this invention to provide a method and apparatus whereby electrical condensers of the variable type, for instance, of the type used for radio receiving apparatus, may be simply, quickly and accurately tested.

In a copending application, filed May 24, 1929, Serial No. 365,645, I have disclosed a method of testing a condenser which comprises generating currents of known fundamental frequency and known higher harmonics of said fundamental, and utilizing said currents for determining the tuning positions of the condenser under test corresponding to the frequencies of certain of said currents. In accordance with the method of said application, the testing currents are impressed on a tuned circuit including the condenser under test, the setting of the condenser is varied, and those points of setting where conditions of resonance occur are ascertained by a current indicator included in the tuned circuit. Such points are compared with the ideal points and the deviations or errors noted.

The present invention involves audible means for testing the condenser. In accordance with the invention, the condenser is included in the circuit of an oscillator and is utilized to tune said circuit and vary the frequencies of the generated currents. The generated currents are impressed upon, and caused to heterodyne with, testing currents which may be generated as described in my prior application or otherwise. The resulting currents are sent into a sound indicator, such as a loud speaker. The condenser is set at points which should give frequencies to the generated currents of the same values as those of the selected harmonics of the testing currents. The production of sound with the condenser at a given setting indicates that the resultant or beat frequency of the currents is within audible range and that the generated current has a frequency deviating less than an audio frequency from the ideal. In such case, the condenser is found satisfactory for that setting, as it produces a current with a frequency sufficiently close to the ideal.

In the accompanying drawings, which illustrate a practical embodiment of the invention—

Figure 2 is a plan view of a fixture used for testing gang condensers;

Figure 3 is a cross-section taken as on line 3—3 of Figure 2.

Figure 1:
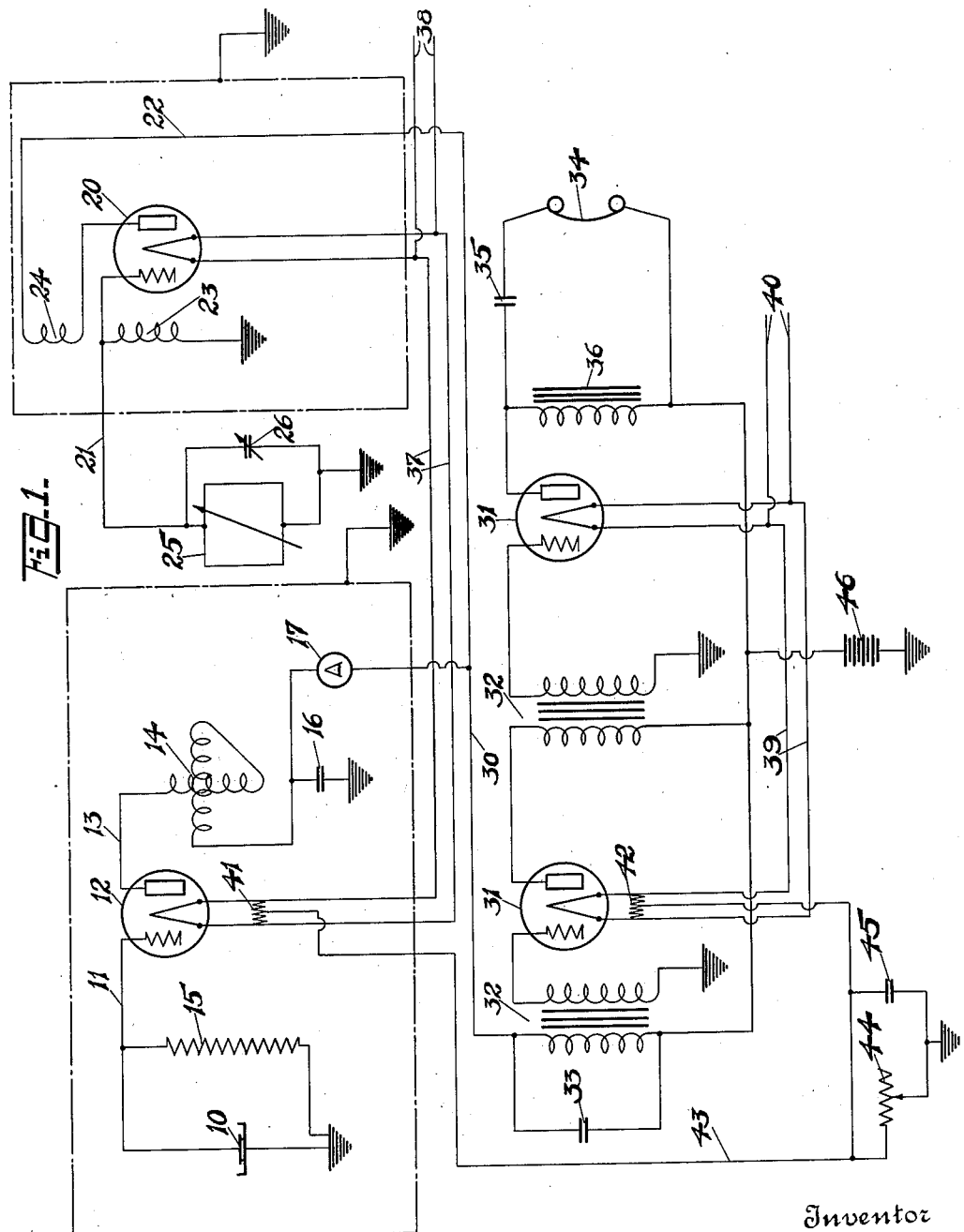
Figure 1 is a circuit diagram of the testing system.

In the embodiment chosen to illustrate the invention, means are provided for generating a series of testing currents such that certain currents have frequencies at spaced intervals within the range of the condenser. This is advantageously accomplished by generating currents of fundamental frequency and higher harmonics of said fundamental. Although capable of various arrangements, in that shown as an example, the generating means embody an oscillation generator employing a piezo-crystal for maintaining the fundamental frequency constant.

In this exemplification, an oscillating piezo-crystal 10 is located in the grid circuit 11 of a suitable three-element tube 12. The plate circuit 13 is provided with inductance, in this case, a variable inductance 14 which allows tuning of the plate circuit. The inductance is set at a point where the higher harmonic currents are generated the strongest. In shunt across the grid is a resistance 15 of approximately one megohm for the purpose of maintaining the grid potential constant. In the plate circuit is a fixed condenser 16 to insulate the high voltage from the operator and a milleammeter 17 to indicate the output current.

The oscillation generator described differs from the oscillators generally employed in that it is purposely constructed to give not only a current of fundamental frequency but also accompanying higher harmonic currents of appreciable strength.

The invention in its entirety involves means for utilizing the condenser to tune the circuit of a generator and to vary the frequency of the generated current in accordance with the setting of the condenser. As here shown, the generator is a three-electrode thermionic tube 20, the grid and plate circuits 21, 22 of which are inductively coupled by coils 23, 24 respectively in said circuits to provide regeneration. The grid circuit 21 includes the condenser 25 under test. A small variable condenser 26 is advantageously arranged in shunt to the condenser under test to permit the use of piezo crystals having different frequency characteristics and to compensate for different crystal values. The setting of the condenser determines the tuning of the circuit and the frequency of the generated current. The two oscillators are advantageously shielded. Each may, for example, be enclosed within a separate shielding casing.

Means are provided for superimposing the generated currents upon one another. To this end, as here shown, the plate or output circuits of the two oscillators are connected to a common output circuit 30.

Means are provided for determining whether the resultant frequency of the composite current is within audible range. This is advantageously achieved by amplifying the resultant current and sending the amplified resultant into a sound indicator or loud speaker. In the illustrated embodiment, the common output circuit is connected to a plurality of three-electrode thermionic tubes 31 having their circuits connected in cascade by coupling coils 32. The resultant current is repeated successively through said tubes and amplified. As here shown, a by-pass condenser 33 is shunted around the first coupling coil. The output circuit of the last amplifying tube is connected to loud speaker 34, through sound filters, comprising a series condenser 35 and shunt choke 36. The production of sound in the loud speaker indicates that the resultant frequency of the composite current is within audible range and that the generated currents have frequencies differing by less than audio frequency.

In the exemplification, the filaments of the tube oscillators are connected by conductors 37 and filament current is supplied from leads 38 connected to said conductors. The filaments of the amplifying tubes 31 are likewise connected by conductors 39 supplied by current through leads 40. Across the filament of the oscillator tube 12 is a high resistance 41 of approximately 50 ohms. A resistance 42 of like value is connected in shunt across the filament of the first amplifying tube 31. The mid-points of these resistances are interconnected by a conductor 43 which is grounded through a circuit containing a high resistance 44 of approximately 200 ohms and a condenser 45 of about 1 microfarad in shunt to the resistance, the ground circuit providing a leakage path for abnormal filament current conditions. Space current is supplied to the plate circuits of the tubes by a properly connected B-source 46.

A fixture is provided in which a gang condenser may be positioned for testing and with means whereby the individual condensers of the gang assembly may be individually and selectively included in the testing circuit. Although capable of various constructions, in that here shown as an example, the fixture comprises a base 50 (Figure 2) having spring clips 51 between which the gang condenser is positioned and resiliently held. The gang condenser here shown is of the type which comprises a frame 52, a rotor shaft 53 running lengthwise of the frame, rotors spaced on the shaft and stators for the rotors, the stators being carried by the frame and insulated therefrom. The rotors are connected in the circuit by a conducting clip 54 having a terminal 55. The clip contacts with a screw fastening the stator insulation to the frame, the circuit being established through the clip, screw, frame, rotor shaft and rotors. Means for individually and selectively including the stators in the circuit are provided. As here shown, the mechanism for accomplishing this purpose comprises a horizontal shaft 56 mounted in parallel spaced relation to the condenser and rotor shaft thereof in suitable bearing members 57. One end of shaft 56 has a terminal 58 for connection of the shaft in circuit, the other end a knob 59 for convenient rotation of the shaft. The shaft carries radially extending spring fingers 60 for engagement with screws 61 supporting the stators from the insulation and conductively connected to the stators. The fingers are spaced radially on the shaft so as to engage the stators individually and selectively and to include the individual condensers individually and selectively in circuit upon appropriate manipulation of the knob. The rotor shaft of the condenser is here shown as projecting beyond the condenser frame, and provided with a knob 62 with drum 63. Marks are placed on the periphery of the drum indicating the ideal points or points where heterodyning should occur if the condensers are properly constructed.

In testing out the gang condenser, the individual condensers are included one at a time in circuit. Each individual condenser is tested while in circuit. This is accomplished, as already indicated, by turning the rotor shaft to points where the loud speaker indicates heterodyne. The points of heterodyne are compared with the ideal points marked on drum 63 and the deviations or errors noted. Some tolerance or error is permissible, but, if the error for any point exceeds such tolerance, the condenser should be rejected and returned for adjustment or repair.

The knob and drum mechanism is a temporary attachment which may be removed from the condenser after test and used on condensers subsequently tested.

What is claimed is:

1. The method of testing a variable electric condenser which comprises utilizing the condenser to tune the circuit of a generator, thereby to vary the frequency of the generated current, generating currents of known fundamental frequency and known higher harmonics of said frequency so that certain selected currents have frequencies at spaced intervals within the range of the condenser, impressing the first generated current upon the selected currents, amplifying the resultant and sending the amplified resultant into a loud speaker, setting the condenser at those points of setting producing heterodyne conditions, and noting the deviation of such points from the designed settings for the frequencies of the selected testing currents.

2. Arrangement for testing a variable electric condenser comprising a circuit adapted to include the condenser and to be tuned thereby, a regenerative tube oscillator in said circuit producing a current, means for generating currents of known fundamental frequency and known higher harmonics of said frequency, means for impressing the first current on said harmonic currents, amplifying means for the composite currents, and a loud speaker into which the amplified composite currents are sent.

In testimony whereof, I have hereunto set my hand.

MORRIS H. BENNETT.